(12) United States Patent
Cicero

(10) Patent No.: US 12,472,609 B1
(45) Date of Patent: Nov. 18, 2025

(54) METHODS OF USE OF A TOOL FOR PLACING AND REMOVING EDGE PROTECTORS AND REMOVING TARPS FROM CARGO OF A FLAT BED TRAILER

(71) Applicant: David J. Cicero, Saylorsburg, PA (US)

(72) Inventor: David J. Cicero, Saylorsburg, PA (US)

( * ) Notice: Subject to any disclaimer, the term of this patent is extended or adjusted under 35 U.S.C. 154(b) by 35 days.

(21) Appl. No.: 17/532,796

(22) Filed: Nov. 22, 2021

Related U.S. Application Data

(60) Provisional application No. 63/116,396, filed on Nov. 20, 2020.

(51) Int. Cl.
*B25B 27/14* (2006.01)
*B25G 1/04* (2006.01)

(52) U.S. Cl.
CPC ............... *B25B 27/14* (2013.01); *B25G 1/04* (2013.01); *Y10T 29/49822* (2015.01); *Y10T 29/49826* (2015.01)

(58) Field of Classification Search
CPC .................................. B25B 27/14; B25G 1/04
See application file for complete search history.

(56) References Cited

U.S. PATENT DOCUMENTS

| | | | | |
|---|---|---|---|---|
| 3,469,878 A | * | 9/1969 | De Haan | B60P 3/41 294/210 |
| 5,730,033 A | * | 3/1998 | Mitrowski | H01J 9/006 81/53.11 |
| 6,425,614 B1 | * | 7/2002 | Limber | B25B 9/00 248/219.2 |
| 6,820,906 B1 | * | 11/2004 | Mcclendon | B60P 7/0823 410/99 |
| 7,393,031 B2 | * | 7/2008 | Goulet | B60P 7/0846 410/97 |
| 8,915,685 B2 | * | 12/2014 | Flores | B65B 13/181 410/99 |
| 9,744,664 B1 | | 8/2017 | Santiago et al. | |
| 10,081,097 B1 | * | 9/2018 | Abbey | B25G 1/04 |
| 2020/0284409 A1 | * | 9/2020 | Lingelbach | B25J 1/04 |

* cited by examiner

*Primary Examiner* — Sarang Afzali

(74) *Attorney, Agent, or Firm* — Wilkinson Law Office; Clinton H. Wilkinson

(57) ABSTRACT

A tool and method for installing and removing an edge protector on cargo of a trailer by a user standing on the ground and for removing a tarp on the cargo by the user standing on the ground. The tool includes a working head and an elongated handle. The working head is an elongated body having a longitudinal axis, a top end portion and a bottom end portion. The top end portion is rounded with at least a portion being of a convex shape. The elongated body includes a fixed size slot extending parallel to the longitudinal axis configured to receive and frictionally a portion the edge protector therein to install and remove the edge protector from the cargo. The elongated handle is connected to the bottom portion of the working head to manipulate the tool.

6 Claims, 4 Drawing Sheets

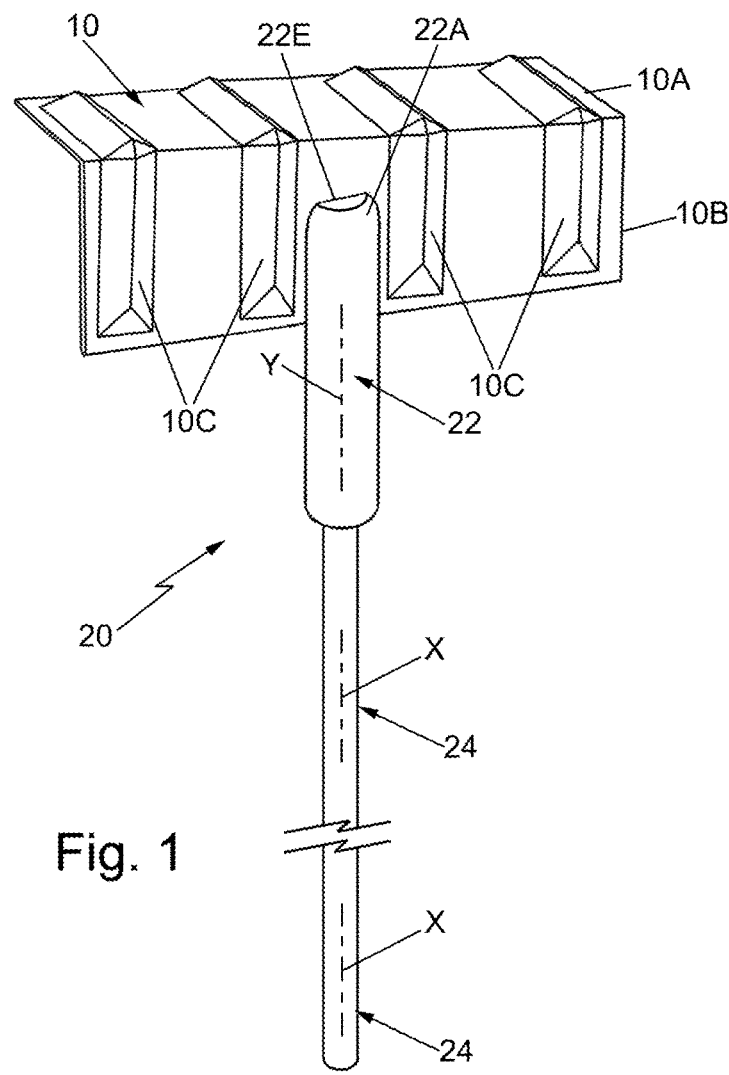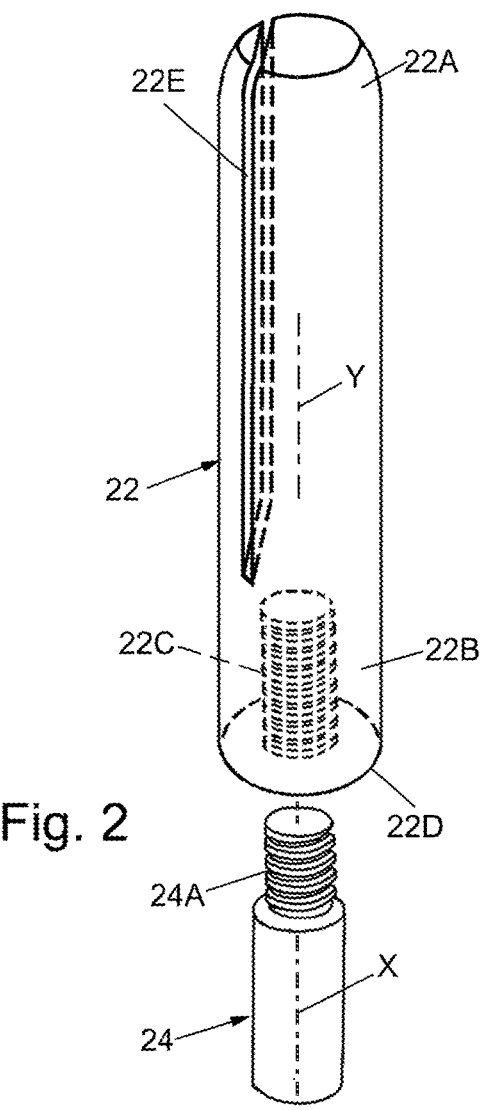
Fig. 1
Fig. 2

METHODS OF USE OF A TOOL FOR PLACING AND REMOVING EDGE PROTECTORS AND REMOVING TARPS FROM CARGO OF A FLAT BED TRAILER

CROSS REFERENCE TO RELATED APPLICATIONS

This application claims the benefit of U.S. Provisional Application No. 63/116,396, filed on Nov. 20, 2021, which is hereby incorporated by reference in its entirety.

FIELD OF THE INVENTION

This invention relates generally to tools and more particularly to tools for use in the trucking industry to facilitate placement of edge protectors on cargo on a flatbed trailer by a person standing on the ground and also facilitating removal of tarps from cargo on a flatbed trailer by a person standing on the ground.

BACKGROUND OF THE INVENTION

Cargo on a flatbed trailer is typically held in place by one or more tie-down or hold-down straps to prevent the cargo from shifting or at worst falling off of the trailer. In order to protect the cargo, particularly if it is susceptible to damage by the hold down strap, so-called "edge protectors" are provided interposed between the strap and the cargo. There are many types of edge protectors, but most are integral members formed of any suitable material, e.g., a strong plastic, and include a pair of planar sections which are perpendicular to each other. In use one of the planar sections is disposed over the top surface of the cargo, e.g., the top surface of a carton, with the other section of the edge protector disposed over a side surface of the cargo, e.g., a side surface of the carton. The edge protectors can be disposed on the cargo by a person climbing onto the flatbed trailer to install the edge protectors. However, that action is time consuming and potentially hazardous. Thus, it is a common practice to install the edge protectors from the ground. Various tools are commercially available to achieve that end, i.e., they enable a person standing on the ground to extend the edge protector up to a corner of the cargo on which the edge protector is to be mounted and to place it on that corner. Such tools enable the user to remove the edge protectors from the ground.

The patent literature also includes various patents disclosing tools for placing and removing edge protectors from cargo by a user standing on the ground. For example, U.S. Pat. No. 6,820,906 (McClendon) discloses a hand tool for lifting and positioning a corner protector under the cargo tie-down strap on a flatbed trailer or other cargo transportation vehicle. This tool enables the corner protector to be quickly and easily applied by the truck driver while standing on the ground. The tool has a straight tubular handle that can be connected to a telescoping extension pole for reaching the top of tall cargo loads. The working end of the tool has front and back clamping panels hingedly connected by a spring-loaded clamping-jaw means that can clamp a corner protector between the panels. In use, the corner protector is inserted between the front and back panels of the installation tool, with the extension pole attached. Then, holding the tool with one hand and slightly lifting the tie-down strap with the other hand, the corner protector is placed over the cargo corner to be protected. The strap is then pulled downward on to the top of the corner protector and the installation tool is pulled downward disengaging it from the corner protector, thereby leaving the corner protector in place under the strap.

U.S. Pat. No. 10,081,097 (Abbey) discloses a tool for the placement of cargo straps and edge protectors for use with a flatbed trailer. The tool is configured for use with a webbing to secure cargo to the flatbed trailer. The tool attaches to the webbing and is used to position the webbing relative to the cargo such that once the webbing is tightened the webbing to be tightened secures the cargo to the flatbed trailer. The tool comprises a telescopic handle, a spatula, and a threaded connection which attaches the spatula to the telescopic handle.

While the prior art tools for placing and removing edge protectors appear generally suitable for their intended purpose of enabling a user to place or remove an edge protector on cargo on a trailer from a position on the ground, they leave something to be desired from the standpoints of simplicity of construction, low cost and ease of use. Thus, a need exists for a tool for facilitating placement of an edge protector on cargo from the ground which overcomes the drawbacks of the prior art. The subject invention addresses that need. In addition, it addresses another need, relating to tarps for cargo to be described immediately below.

In order to protect the cargo on a flatbed or unenclosed trailer from the elements, e.g., rain, snow, etc., one or more tarps is/are disposed over the cargo. Typically that is accomplished by a person standing on the ground throwing the tarp over the load, instead of having the person climb onto the trailer to install that tarp since such action is time consuming and potentially dangerous. Once the tarp is in place, it is then typically secured in place by tie-down or hold-down straps or other components securing the tarp to a portion of the trailer.

The placing of the tarp on the cargo from the ground by a person as described above is a relatively easy process. Removal of the tarp is not so easy. In particular, to remove a tarp from cargo on the flatbed trailer, by a person standing on the ground, the person has to pull on the tarp from the ground. Due to the fact that many cargos have relatively sharp corners, those corners frequently catch onto the tarp to interfere with the removal of the tarp when a person standing on the ground attempt to pull the tarp off of the cargo. In fact, depending upon the sharpness of the corner(s) the tarp may be damaged in pulling it off from the ground.

Thus, a need exists for a tool which will enable a tarp to be readily removed from cargo on a flatbed trailer from the ground.

The subject invention addresses both needs, by providing a tool that facilitates the placing and removing of corner protectors on cargo on a flatbed trailer from the ground and for also providing a tool that facilitates the removal of a trap from cargo on a flatbed trailer from the ground.

All references cited and/or identified herein are specifically incorporated by reference herein.

SUMMARY OF THE INVENTION

One aspect of this invention is a tool for installing and removing an edge protector on cargo on a trailer and for removing a tarp on cargo on a trailer. The edge protector includes a pair of generally planar sections extending perpendicularly to each other. The tool comprises a working head and an elongated handle. The working head comprises an elongated body having a longitudinal axis, a top end portion and a bottom end portion. The top end portion is rounded with at least a portion being of a convex dome shape. The elongated body includes a slot extending parallel to the longitudinal axis. The slot is of a fixed size and includes an entrance mouth located at the top end portion. The slot is configured to receive and frictionally hold a portion of one of the pair of generally planar sections of the edge protector therein. The elongated handle is connected to the bottom portion of the working head, whereupon the elongated handle extends along the longitudinal axis.

In accordance with one preferred aspect of the tool of this invention, the slot extends slightly laterally of the longitudinal axis.

In accordance with another preferred aspect of the tool of this invention, the elongated body is of circular cross-section centered about the longitudinal axis.

In accordance with another preferred aspect of the tool of this invention, one of the bottom portion of the working head and an end portion of the elongated handle includes a bore and the other of the bottom portion of the working head and the end portion of the elongated handle includes a projection. The projection is configured to be received within the bore.

In accordance with another preferred aspect of the tool of this invention, the bore and the projection are configured to be releasably secured to each other.

In accordance with another preferred aspect of the tool of this invention, the bore includes internal threads and the projection includes external threads.

In accordance with another preferred aspect of the tool of this invention, the working head is formed of a plastic material.

In accordance with another preferred aspect of the tool of this invention, the elongated body is approximately 6 inches in length and has an outside diameter of approximately 2 inches, and wherein the slot is in the range of approximately 0.125 inch to 0.375 inch in thickness, and has a length of at least 3 inches.

In accordance with another preferred aspect of the tool of this invention, the rounded top end comprises a truncated convex dome shape.

Another aspect of this invention is a method of installing an edge protector on cargo on a trailer by a person standing on the ground. The edge protector includes a pair of generally planar sections extending perpendicularly to each other. The method comprises providing a tool comprising a working head and a handle. The working head has an elongated body having a longitudinal axis, a top end portion and a bottom end portion. The top end portion is rounded with at least a portion being of a convex dome shape. The elongated body includes a slot extending parallel to the longitudinal axis. The slot is of a fixed size and includes an entrance mouth located at the top end portion. The slot is configured to receive and frictionally hold a portion of one of the pair of generally planar sections of the edge protector therein. The elongated handle is connected to the bottom portion of the working head, whereupon the elongated handle extends along the longitudinal axis. A first one of the pair of generally planar sections of the edge protector is inserted within the slot to frictionally mount the edge protector on the working head. The handle is grasped and manipulated to move the working head to a position adjacent a corner of the cargo on the trailer, whereupon a second one of the pair of generally planar sections of the edge protector is disposed over a horizontally extending portion of the corner. The handle is retracted in a downward direction parallel to the longitudinal axis, whereupon the second one of the pair of generally planar sections of the edge protector engages the horizontally extending portion of the corner. The handle is continued to be retracted in a downward direction parallel to the longitudinal axis such that the first one of the pair of generally planar sections of the edge protector automatically exits the slot, thereby leaving the edge protector on the corner.

In accordance with one preferred aspect of the method of installing an edge protector on cargo on a trailer by a person standing on the ground, the method additionally comprises extending a tie-down strap over the edge protector, and securing the tie-down strap to the trailer.

Another aspect of this invention is a method of removing an edge protector on a corner of cargo on a trailer by a person standing on the ground. The edge protector includes a pair of generally planar sections extending perpendicularly to each other. A first one of the generally planar sections is disposed on a vertically extending portion of the corner and a second one of the generally planar sections is disposed on a horizontally extending portion of the corner. The method comprises providing a tool comprising a working head and an elongated handle. The working head has an elongated body having a longitudinal axis, a top end portion and a bottom end portion. The top end portion is of a convex dome shape. The elongated body includes a slot extending parallel to the longitudinal axis. The slot is of a fixed size and includes an entrance mouth located at the top end portion. The slot is configured to receive and frictionally hold a portion of one of the pair of generally planar sections of the edge protector therein. The elongated handle is connected to the bottom portion of the working head, whereupon the elongated handle extends along the longitudinal axis. The handle is grasped and manipulated to move the working head to a position adjacent the corner, with the entrance to the slot located below a bottom edge of the first one of the planar sections of the edge protector. The handle is raised in an upward direction generally parallel to the longitudinal axis to cause the first one of the pair of generally planar sections of the edge protector to be located within the slot to frictionally mount the edge protector on the working head. The handle is continued to be raised in an upward direction parallel to the longitudinal axis, whereupon the second one of the pair of generally planar sections of the edge protector lifts off of the horizontally extending portion of the corner. The handle is moved laterally with respect to the longitudinal axis and then in a downward direction parallel to the longitudinal axis to carry the edge protector downward and away from the cargo.

In accordance with one preferred aspect of the method of removing an edge protector on cargo on a trailer by a person standing on the ground, a tie-down strap extends over the edge protector and is under tension to hold the cargo on the trailer. The method comprises releasing the tension on the tie-down strip so that the tie-down strap and the edge protector can be removed from the cargo by a person standing on the ground.

In accordance with another preferred aspect of the method of removing an edge protector on cargo on a trailer by a person standing on the ground, a tarp is located over the cargo on the trailer. The tarp has an inner surface a portion of which is disposed over a corner of the cargo on the trailer. The method comprises removing the tarp from the cargo by a person standing on the ground prior to removal of the edge protector by the person. The removal of the tarp comprises grasping and manipulating the tool whereupon the top end portion of the working head is located under the tarp to engage a portion of the inner surface of the tarp adjacent the corner of the cargo. The handle is raised in an upward direction generally parallel to the longitudinal axis to cause top end portion of the working head to lift the portion of the inner surface of the tarp off of the corner, thereby freeing the tarp from the corner. The tarp is pulled off of the cargo after the tarp is freed of the corner.

Another aspect of this invention is a method of removing a tarp disposed over cargo on a trailer by a person standing on the ground, the tarp having an undersurface, a portion of which is in engagement with a portion of the cargo. The method comprises providing a tool comprising a working head and an elongated handle. The working head has an elongated body having a longitudinal axis, a top end portion and a bottom end portion. The top end portion is rounded with at least a portion being of a convex dome shape. The elongated body includes a slot extending parallel to the longitudinal axis. The slot is of a fixed size and includes an entrance mouth located at the top end portion. The slot is configured to receive and frictionally hold a portion of one of the pair of generally planar sections of the edge protector therein. The elongated handle is connected to the bottom portion of the working head, whereupon the elongated handle extends along the longitudinal axis. The handle is grasped and manipulated, whereupon the top end portion of the working head is located under the tarp to engage a portion of the inner surface of the tarp adjacent the corner of the cargo. The handle is raised in an upward direction generally parallel to the longitudinal axis to cause top end portion of the working head to lift the portion of the inner surface of the tarp off of the corner, thereby freeing the tarp from the corner. The tarp is pulled off of the cargo after the tarp is freed of the corner.

BRIEF DESCRIPTION OF THE DRAWINGS

The accompanying drawings, which are incorporated in and form a part of the specification, illustrate embodiments of the present invention which will become more fully understood in conjunction with detailed description, wherein:

FIG. 1 is an isometric view of a tool constructed in accordance with this invention being shown for placing or removing a corner protector on cargo on a flatbed trailer and for removing a tarp covering cargo on a flatbed trailer;

FIG. 2 is an enlarged exploded isometric view of the tool shown in FIG. 1;

DETAILED DESCRIPTION OF THE INVENTION

Reference will now be made in detail to embodiments of the present invention, examples of which are illustrated in the accompanying drawings. While the present invention will be described in conjunction with various embodiment(s), such description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications and equivalents, which may be included within the spirit and scope of the invention as defined by the appended claims.

Referring now to the various figures, there is shown in FIG. 1 one exemplary embodiment of a tool 20 constructed in accordance with this invention. The tool basically comprises a working head 22 and a handle 24. The details of the working head will be described shortly. Suffice it for now to state that the working head 22 is constructed so that it can be used for placing or removing an edge protector on cargo located on a trailer, such as a flatbed trailer, by a person, e.g., truck driver, standing on the ground. It can also be used, without changing its configuration, to facilitate the removal of a tarp extended over cargo on a trailer by a person standing on the ground.

Figure 5:
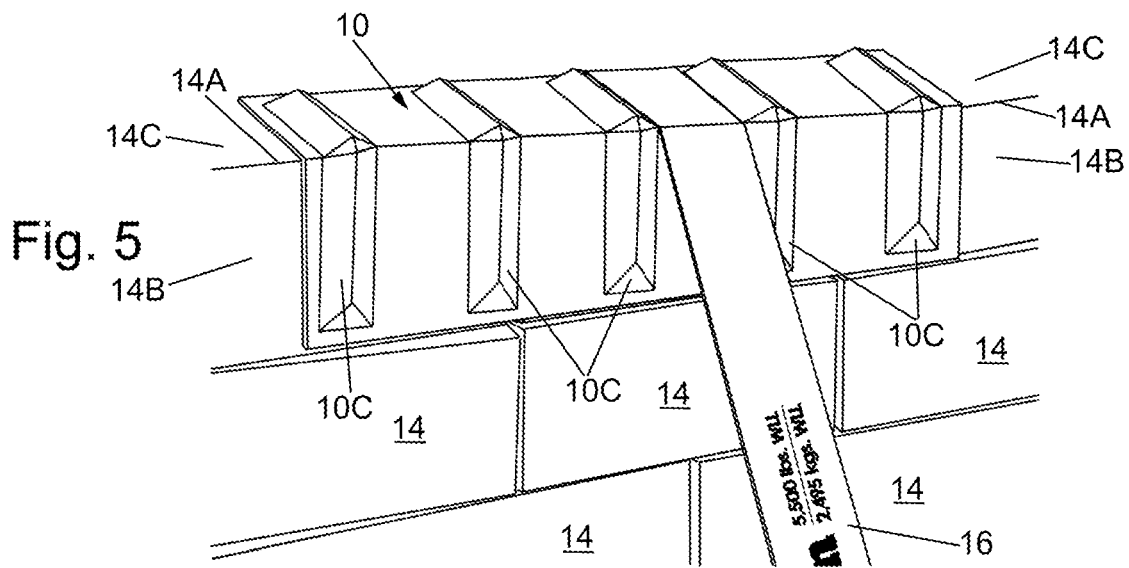
FIG. 5 is an enlarged isometric view of a load of cargo on a flatbed trailer which is held in place by a corner protector and a securement strap, after the corner protector had been placed on the cargo using the tool shown in FIGS. 1-4.
Figure 6:
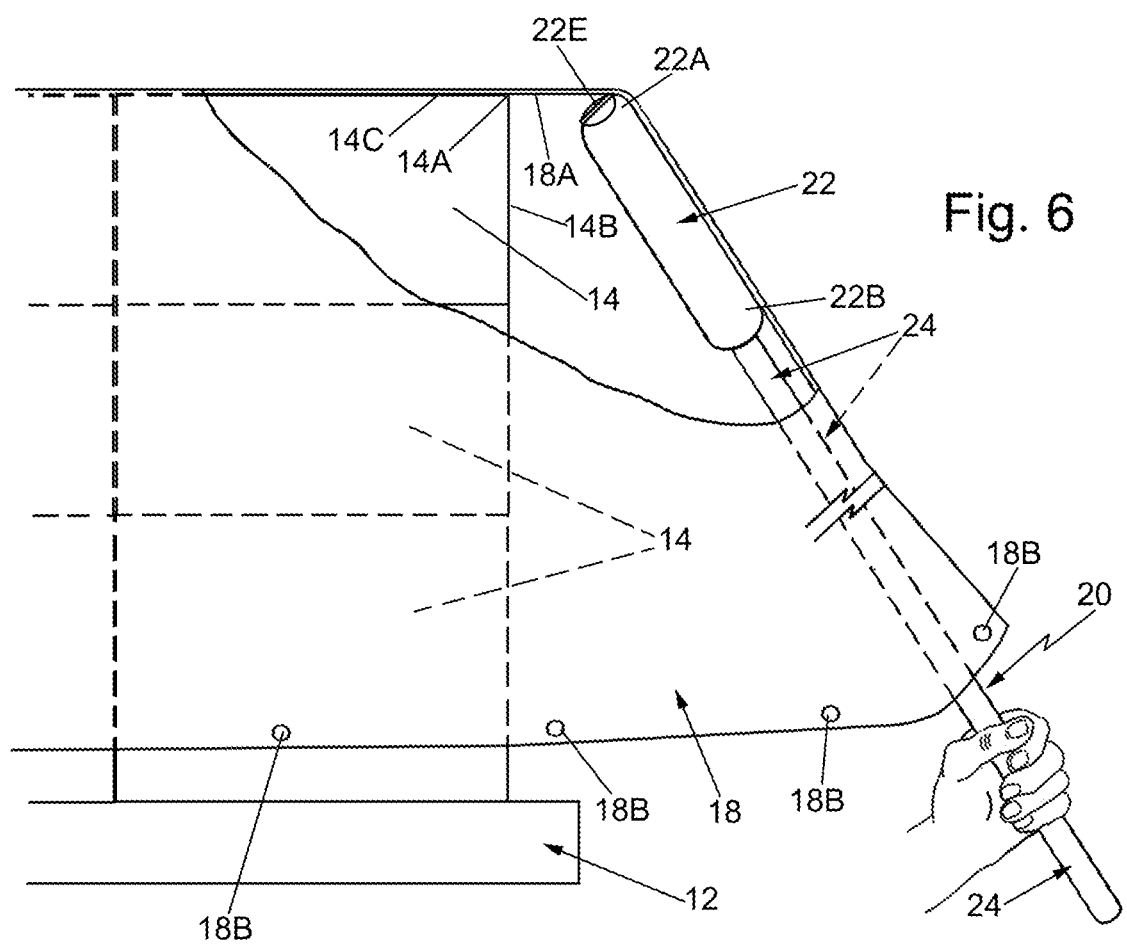
FIG. 6 is an isometric view of the tool shown in FIG. 1, but showing removing a tarp from cargo on a flatbed trailer.

One exemplary conventional edge protector 10 is shown in FIGS. 1 and 5. In FIG. 1 it is shown when used with the tool 20 to place or remove it from cargo on a trailer. In FIG. 5 it is shown disposed on a corner of a load of cargo on a flatbed trailer 12 (FIG. 6). In the illustration of FIG. 5, the cargo is in the form of a plurality of cartons 14 stacked upon one another, with the edge protector 10 being located on a corner 14A of one of the topmost cartons of the load. The edge protector is a conventional component that can take various forms and can be of various sizes, shapes and profiles. It includes two generally planar panels or sections 10A and 10B which extend perpendicularly to each other. The planar panel 10A is oriented vertically so that it can be placed to overlie a vertically oriented portion, e.g., an outside wall 14B of the corner 14A. The planar panel 10B is oriented horizontally so that it overlies the top wall 14C of the top carton forming the corner 14A.

With the edge protector 10 in place, a conventional tie-down strap 16 can be extended over the edge protector and placed under tension and secured to the trailer to hold the edge protector and the carton load thereunder in place. By so doing, the cargo should not shift during transportation, with the edge protector protecting the corner from damage by the tension applied by the tie-down strap.

The exemplary embodiment of the edge protector 10 shown in FIG. 5 includes a plurality of ribs 10C that project outward from the outer surface of the sections 10A and 10B. The ribs provide a convenient space for receipt of the tie-down strap, so that the edge protector 10 with a section of tie-down strap 16 thereon (but not under tension) can be positioned on the corner of the cargo in one step and then the tie-down strap tensioned and secured to the trailer.

As best seen in FIG. 1 the working head 22 is located at the upper end of the handle 24. The handle is an elongated, rod-like member having a central longitudinal axis X. It is preferably of sufficient length so that the when the tool is used by a user, e.g., a trucker, the working head can be positioned to reach an elevated position on the trailer while the user is standing on the ground adjacent the trailer. The handle 24 can be a fixed length member of any desired length or can be constructed so that it is extendable in length, e.g., includes telescoping sections so that it can be extended to a greater length than the length of its individual extendable sections. In any case, the upper end 24 of the handle is configured to be secured to the working head. That securement can be fixed (permanent) or preferably releasable. For example, as best seen in FIG. 2 the handle 24 is in the form of an externally threaded cylindrical projection 24A which is coaxial with the central longitudinal axis X of the handle and is of slightly smaller external diameter than the external diameter of the handle itself. The projection 24A is configured to be screwed into an internally threaded bore (to be described later) of the working head to releasably secure the working head to the handle.

Figure 3:
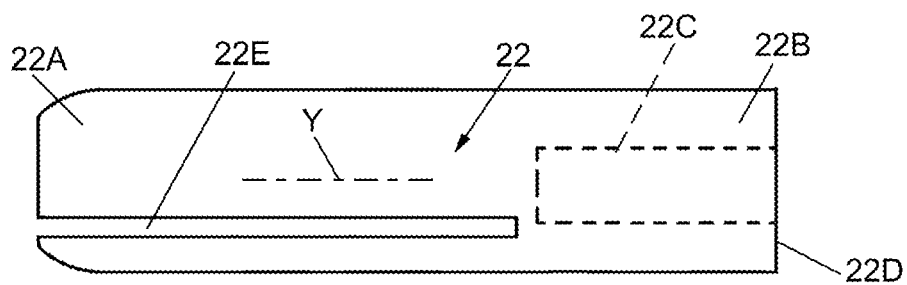
FIG. 3 is a side elevation view of the working head of the tool shown in FIGS. 1 and 2.
Figure 4:
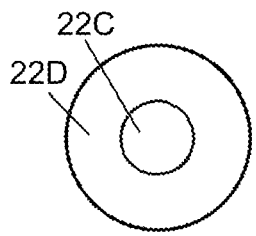
FIG. 4 is an end view taken along line 4-4 of FIG. 3.

The working head 22 is best seen in FIGS. 2-4 and basically comprises a cylindrical member, formed of any suitable material, e.g., plastic, wood, metal, although preferably plastic. The working head has a top end portion 22A which is rounded with at least a portion of it being in the form of a convex dome, and a bottom end portion 22B. In the exemplary embodiment shown the rounded end is in the form of a truncated convex dome shape, but needn't be truncated. In any case, the working head can be any suitable length for the tasks to be achieved by it. One particularly suitable length is approximately 6 inches. In any case the working head includes an internally threaded bore 22C located in the bottom end and centered on the central axis Y of the working head. The central axis Y of the working head is coaxial with the central axis X of the handle. The bore 22C is open at the bottom surface 22D of the working head so that the externally threaded projection 24A can be screwed therein to mount the working head on the upper end of the handle.

The top end portion 22A of the working head includes an elongated slot 22E extending from an entrance at the outer surface of the top end portion to a terminus adjacent an inner end of the internally threaded bore 22C of the working head. In one exemplary embodiment of this invention the slot extends approximately 4-5 inches from the top end of the working head and parallel to the central axis of the working head, but slightly laterally thereof. The slot is provided to frictionally hold either perpendicular panel 10A or 10B of the edge protector to place or remove the edge protector from a corner of the cargo on the trailer. One preferred exemplary embodiment of the slot 22E has of a thickness within the range of 0.125 inch to 0.375 inch to accommodate conventional edge protectors whose two perpendicular panels are of a thickness in that range so that either of those panels can be frictionally held within the slot.

Use of the tool 20 to install the edge protector 10 onto a load of cargo like that shown in FIG. 5 is as follows. A first panel, e.g., panel 10A of the edge protector is inserted within the slot 22E with the working head being oriented in a somewhat upwardly directed orientation so that the edge protector will be releasably mounted on the working head. The user, who will be standing on the ground adjacent the trailer 12 having a load of cartons 14 thereon, will then grasp the handle of the tool 20 and manipulate the handle to move its working head to a position adjacent the corner 14A of cargo load, so that the second panel, e.g., panel 10B, of the edge protector is disposed over a horizontally extending portion 14B (e.g., the top surface) of the carton 14 at the corner 14A. The user will then retract the handle in a downward direction parallel to the longitudinal axis X, the panel 10B will engage horizontally extending portion of that corner. The user will then continuing to retract the handle in a downward direction parallel to the longitudinal axis X such that the panel 10A automatically exits, i.e., is freed from, the slot 22E, thereby leaving the edge protector 10 on carton corner 14A.

The tie-down strap can then be disposed over the edge protector, by flinging it over the edge protector and then manipulating it so that a portion of it is located between two adjacent ridges 10C of the edge protector 10. The tie-down strap can then be tensioned and secured to the trailer to secure the edge protector and cargo to the trailer.

It should be noted that the tie-down strap 16 can be disposed the cargo at the same time that the edge protector 10 is disposed on the cargo, instead of after the edge protector has been placed on the cargo. To that end, a section of the tie-down strap 16 is placed on the edge protector 10 between an adjacent pair of ridges 10A of the edge protector 10. The edge protector with the tie-down strap 16 draped thereon can then be mounted on the corner of the cargo in the same manner as described above.

Removal of the edge protector 10 from the cargo by a user standing on the ground can be readily accomplished using the tool 20. In particular, if the edge protector is secured in place by a tie-down strap, that strap is first removed by loosening the tension thereon and then pulling the strap off of the edge protector. The user then grasps and manipulates the handle to move the working head to a position adjacent said corner at which the edge protector is located, so that the entrance to the slot is located below a bottom edge of the panel 10A. The user then raises the handle in an upward direction generally parallel to the longitudinal axis x to cause the edge of the panel 10A to enter the entrance to the slot and into the slot until it reaches the bottom of the slot. The user continues to raise the handle in an upward direction parallel to the longitudinal axis X, whereupon the panel 10B of the edge protector lifts off of the top surface of the carton 14 at the corner at which the edge protector is located. The user can then move the handle laterally with respect to the longitudinal axis X and then in a downward direction parallel to that axis to carry said edge protector downward and away from the cargo. The friction between the surfaces of the working head contiguous with the slot 22E and the surfaces of the panel 10A of the edge protector which are in the slot serves to hold the edge protector on the working head to prevent it from falling off the tool as the tool is manipulated to remove the edge protector from the cargo and to bring it down to the user.

Use of the tool to remove a tarp 18 extending over cargo on a trailer will now be described with reference to FIG. 6. The illustration of FIG. 6 shows a cargo load of cartons 14 on the flatbed of a trailer 12, with a person (only the hand of which is illustrated) using the tool 20 to facilitate the removal of the tarp from the cargo. The tarp can be of any construction and includes an inner surface 18A which is shown engaging various portions, e.g., the top surfaces 14C of the uppermost cartons 14 of the cargo load. The exemplary embodiment of the tarp shown in FIG. 6 includes a plurality of grommets 18B which may be used to secure the marginal edges of the tarp to the trailer by any suitable connectors, e.g., straps, bungee cords, etc. In order to remove the tarp the means for securing the tarp to the trailer are removed or otherwise disconnected, so that the user can insert the working head under the tarp from a position wherein the person is standing on the ground adjacent the trailer.

The user can then manipulate the tool 20 so that its convex domed top end portion is located under the tarp 18 to engage a portion of the inner surface 18A adjacent a corner of the cargo, which corner could act as a snag to prevent the easy removal of the tarp. The user then will then raise the handle 24 of the tool 20 in an upward direction generally parallel to the longitudinal axis X of the tool to cause the top end portion 22A to lift the portion of the inner surface 18A of the tarp 18 off of the corner, thereby freeing the tarp from that corner. Once the tarp is free of the corner, the person can pull downward on the tarp to remove it from the cargo load. As will be appreciated the convex domed end surface of the working head will minimize if not eliminate any danger of piercing or otherwise damaging the tarp if the top end surface of the working head was angular or in any way sharp ended.

Figure 7:
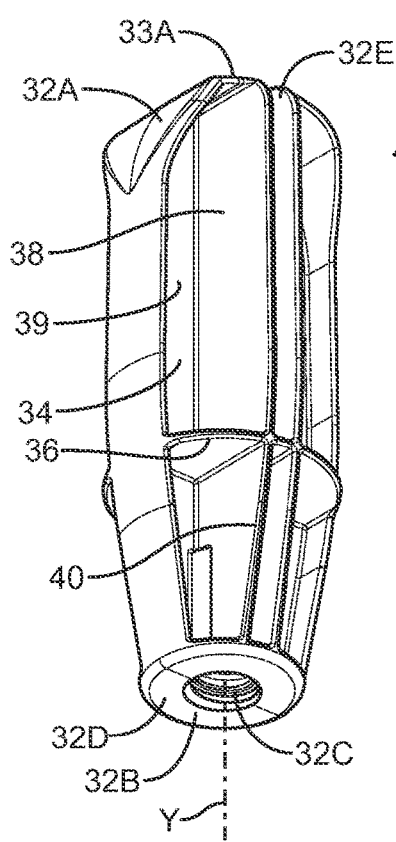
FIG. 7 is an isometric view from the bottom of another embodiment of the working head of the tool.
Figure 8:
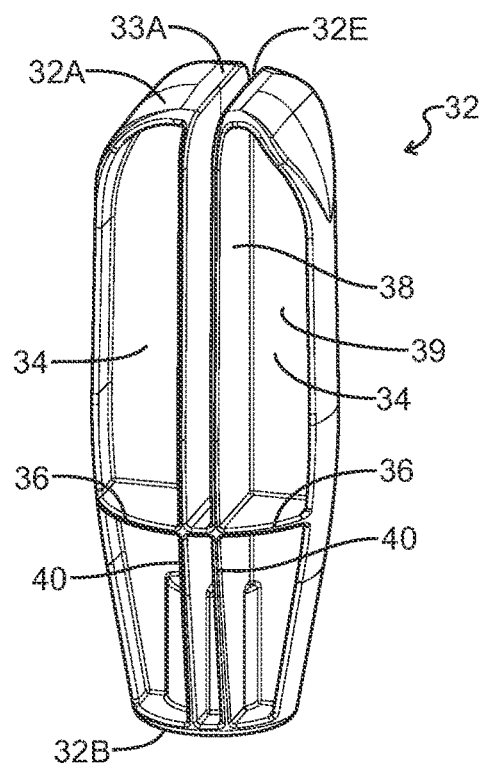
FIG. 8 is an isometric view from the top of the working head of the tool shown in FIG. 7.
Figure 9:
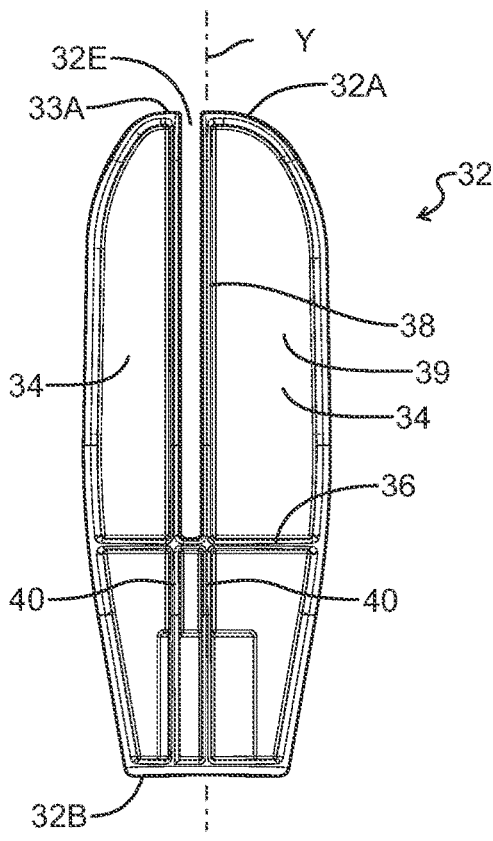
FIG. 9 is a side elevation view of the working head of the tool shown in FIGS. 7 and 8.

FIGS. 7-9 illustrate another embodiment of the working head of the tool 20 of the invention. Working head 32 is similar to working head 22 described above in that it has an elongated body extending along a central axis Y, a top end portion 32A and a bottom end portion 32B. In the exemplary embodiment shown, top end portion 32A is curvilinear or rounded with at least a portion having a convex shape and a top end surface 33A that may be truncated, but it needn't be truncated. The working head 32 also includes an internally threaded bore 32C located in the bottom end portion 32B and centered on the central axis Y of the working head 32. The bore 32C is open at the bottom surface 32D of the working head 32 so that an externally threaded handle projection such as handle projection 24A shown in FIG. 2 can be similarly screwed therein to mount the working head 32 on the upper end of the handle.

The top end portion 32A of the working head 32 includes an elongated slot 32E extending inwardly from an entrance at the top or outer surface 33A of the top end portion 32A to a terminus adjacent an inner end of the internally threaded bore 32C of the working head 32. The slot 32E is provided to frictionally hold either perpendicular panel 10A or 10B of the edge protector 10 to place or remove the edge protector 10 from a corner of the cargo on the trailer.

Working head 32 is preferably molded out of a plastic material and comprises reinforcing shapes in the elongated body. Working head 32 comprises several recessed areas 34 in the side wall of the elongated body with reinforcing or stiffening ribs 36 extending perpendicular to the axis Y in recessed areas 34 to reinforce the stiffness of the elongated body. In the exemplary embodiment, recessed areas 34 include a wall 38 which is parallel to elongated slot 32E, and another wall 39 which is perpendicular to elongated slot 32E, with a stiffening rib 36 connecting between walls 38 and 39 along the inner terminus of the elongated slot 32E. Stiffening rib 36 has a rounded outer edge and forms a circular configuration centered about the central longitudinal axis of the working head 32. Stiffening ribs 40 extending in the direction of the central axis Y connect between stiffening ribs 36 at the inner end of the elongated slot 32E and bottom end portion 32B. Additional stiffening ribs similar to rib 36 may be provided in other embodiments to maintain the stiffness and circular shape of the working head 32.

The working head 32 can be any suitable length for the tasks to be achieved by it. One particularly suitable length is approximately 7 inches. In one exemplary embodiment of this invention the slot extends approximately 4-5 inches from the top end surface 33A of the working head 32 and parallel to the central axis Y of the working head, but slightly laterally thereof. The offset slot in particular aids users in successfully positioning the entrance mouth of the slot located at the top end portion of the working head to receive and frictionally engage a portion of one of the pair of generally planar sections of the edge protector therein, both in initial placement and removal of an edge protector on a load since the planar sections of the edge protector can be positioned with the tool more closely against the load. One preferred exemplary embodiment of the slot 22E has a thickness within the range of 0.125 inch to 0.375 inch to accommodate conventional edge protectors whose two perpendicular panels are of a thickness in that range so that either of those panels can be frictionally held within the slot. In one exemplary embodiment of this invention working head 32 has an outside width of between approximately 2-3 inches, and a width of between approximately 1-2 inches between the opposite sides of the working head containing recesses 34.

While the invention has been described in detail and with reference to specific examples thereof, it will be apparent to one skilled in the art that various changes and modifications can be made therein without departing from the spirit and scope thereof.

I claim:

1. A method of installing an edge protector on cargo on a trailer by a person A standing on the ground, the edge protector including a pair of planar sections extending perpendicularly to each other, said method comprising:
   providing a tool comprising a working head having an elongated body having a longitudinal axis, a top end portion and a bottom end portion, said top end portion being rounded with at least a portion being of a convex shape, said elongated body including a slot extending parallel to said longitudinal axis, said slot being of a fixed size and including an entrance mouth located at said top end portion, said slot being configured to receive and frictionally hold a portion of one of the pair of planar sections of the edge protector therein, and an elongated handle connected to said bottom portion of said working head, whereupon said elongated handle extends along said longitudinal axis;
   inserting a first one of said pair of planar sections of said edge protector within said slot to frictionally mount said edge protector on said working head;
   grasping and manipulating said handle to move said working head to a position adjacent a corner of said cargo on said trailer, whereupon a second one of said pair of planar sections of said edge protector is disposed over a horizontally extending portion of said corner;
   retracting said handle in a downward direction parallel to said longitudinal axis whereupon said second one of said pair of planar sections of said edge protector engages said horizontally extending portion of said corner; and
   continuing to retract said handle in a downward direction parallel to said longitudinal axis such that said first one of said pair of planar sections of said edge protector automatically exits said slot, thereby leaving said edge protector on said corner.

2. The method of claim 1, additionally comprising extending a tie-down strap over said edge protector, and securing said tie-down strap to said trailer.

3. The method of claim 2, wherein the tie-down strap extends over said edge protector and is under tension to hold said cargo on said trailer, and wherein said method further comprises releasing said tension on said tie-down strip so that said tie-down strap and said edge protector can be removed from said cargo by said person standing on the ground.

4. The method of claim 2, wherein a tarp having an inner surface a portion of which is disposed over a corner of said cargo on said trailer, wherein said method further comprises removing said tarp from said cargo by said person standing on the ground prior to removal of said edge protector by said person, wherein said removal of said tarp comprises:
   grasping and manipulating said tool whereupon said top end portion of said working head is located under said tarp to engage a portion of said inner surface of said tarp adjacent said corner of said cargo;

raising said handle in an upward direction parallel to said longitudinal axis to cause top end portion of said working head to lift said portion of said inner surface of said tarp off of said corner, thereby freeing said tarp from said corner; and pulling said tarp off of said cargo after said tarp is freed of said corner.

5. A method of removing an edge protector on a corner of cargo on a trailer by a person standing on the ground, the edge protector including a pair of planar sections extending perpendicularly to each other, a first one of said planar sections being disposed on a vertically extending portion of said corner and a second one of said planar sections being disposed on a horizontally extending portion of said corner, said method comprising:

providing a tool comprising a working head having an elongated body having a longitudinal axis, a top end portion and a bottom end portion, said top end portion being rounded with at least a portion being of a convex shape, said elongated body including a slot extending parallel to said longitudinal axis, said slot being of a fixed size and including an entrance mouth located at said top end portion, said slot being configured to receive and frictionally hold a portion of one of the pair of planar sections of the edge protector therein, and an elongated handle connected to said bottom portion of said working head, whereupon said elongated handle extends along said longitudinal axis;

grasping and manipulating said handle to move said working head to a position adjacent said corner, with said entrance to said slot located below a bottom edge of said first one of said planar sections of said edge protector;

raising said handle in an upward direction parallel to said longitudinal axis to cause said first one of said pair of planar sections of said edge protector to be located within said slot to frictionally mount said edge protector on said working head;

continuing to raise said handle in an upward direction parallel to said longitudinal axis whereupon said second one of said pair of planar sections of said edge protector lifts off of said horizontally extending portion of said corner; and moving said handle laterally with respect of said longitudinal axis and then in a downward direction parallel to said longitudinal axis to carry said edge protector downward and away from said cargo.

6. A method of removing a tarp disposed over cargo on a trailer by a person standing on the ground, the tarp having an undersurface, a portion of which is in engagement with a portion of said cargo, said method comprising:

providing a tool comprising a working head having an elongated body having a longitudinal axis, a top end portion and a bottom end portion, said top end portion being rounded with at least a portion being of a convex shape, said elongated body including a slot extending parallel to said longitudinal axis, said slot being of a fixed size and including an entrance mouth located at said top end portion, said slot being configured to receive and frictionally hold a portion of one of the pair of planar sections of the edge protector therein, and an elongated handle connected to said bottom portion of said working head, whereupon said elongated handle extends along said longitudinal axis;

grasping and manipulating said handle, whereupon said top end portion of said working head is located under said tarp to engage a portion of said inner surface of said tarp adjacent said corner of said cargo;

raising said handle in an upward direction parallel to said longitudinal axis to cause top end portion of said working head to lift said portion of said inner surface of said tarp off of said corner, thereby freeing said tarp from said corner; and pulling said tarp off of said cargo after said tarp is freed of said corner.

* * * * *